(12) United States Patent
Francis

(10) Patent No.: US 10,844,989 B1
(45) Date of Patent: Nov. 24, 2020

(54) SEALING PLUG SYSTEM

(71) Applicant: Trinity Bay Equipment Holdings, LLC, Houston, TX (US)

(72) Inventor: Kirk Spencer Francis, Richmond, TX (US)

(73) Assignee: Trinity Bay Equipment Holdings, LLC, Houston, TX (US)

( * ) Notice: Subject to any disclaimer, the term of this patent is extended or adjusted under 35 U.S.C. 154(b) by 0 days.

(21) Appl. No.: 16/784,097

(22) Filed: Feb. 6, 2020

(51) Int. Cl.
*F16L 55/11* (2006.01)
*F16L 55/105* (2006.01)

(52) U.S. Cl.
CPC ......... *F16L 55/1108* (2013.01); *F16L 55/105* (2013.01)

(58) Field of Classification Search
CPC ....................... F16L 55/1108; F16L 55/105
USPC ........................................................ 138/92
See application file for complete search history.

(56) References Cited

U.S. PATENT DOCUMENTS

| | | | | |
|---|---|---|---|---|
| 150,255 A * | 4/1874 | Phillips | ............... | F16L 55/1651 138/98 |
| 645,502 A * | 3/1900 | Carpenter | ............... | B29C 73/14 152/369 |
| 1,131,745 A * | 3/1915 | Stephens | ................. | B29C 73/06 152/370 |
| 2,020,767 A * | 11/1935 | Bullis | ..................... | A47J 36/40 138/98 |
| 2,476,601 A * | 7/1949 | Harper | .................... | B63B 43/16 114/227 |
| 4,179,038 A * | 12/1979 | Rosan, Jr. | ............... | F16L 55/16 138/94.3 |
| 4,574,971 A * | 3/1986 | Leonard | ............. | F16L 55/1612 138/99 |
| 4,820,564 A * | 4/1989 | Cologna | ................. | B29C 73/14 156/98 |
| 5,033,949 A * | 7/1991 | Jewett | ................. | E04G 23/0203 425/12 |
| 5,927,340 A * | 7/1999 | Barton | .................... | F16L 55/11 138/92 |
| 7,740,028 B1 * | 6/2010 | Wilson | ................ | F16L 55/1612 138/99 |
| 8,820,363 B2 * | 9/2014 | Polivka | .................. | B25B 13/48 138/92 |
| 10,436,373 B2 * | 10/2019 | Gaunce | ............... | F16L 55/1683 |

* cited by examiner

*Primary Examiner* — Craig M Schneider
*Assistant Examiner* — David R Deal
(74) *Attorney, Agent, or Firm* — Fletcher Yoder PC

(57) ABSTRACT

A sealing plug system for sealing a hole in a flexible pipe. A shaft extends through a hole in a conduit. A seal couples to the shaft. The seal sealingly engages an interior surface of the conduit. A reaction collar couples to the shaft. A locking system couples to the shaft. The locking system blocks movement of the shaft in a first direction and allows movement of the shaft in a second direction that is opposite the first direction.

19 Claims, 7 Drawing Sheets

SEALING PLUG SYSTEM

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

In some places, pipeline operators could experience fuel theft through illegal tapping of their pipelines. Thieves may steal the fuel by digging to reach a buried pipeline and then drilling a hole in the pipe. The release of fuel through the hole may be collected with hoses and buckets for use by the thieves or sold on the black market. These illegal taps result in fuel loss and spillage that damages the environment, and may affect the structural integrity of the pipelines.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Instead of or in addition to digging up a pipeline or digging new trenches to install new pipeline, flexible pipe may be installed into existing pipeline infrastructure. Indeed, flexible pipe is durable and operational in harsh operating conditions and can accommodate high pressures and temperatures. In the event that even the flexible pipe is tapped or damaged, however, holes in the flexible pipe after installation inside other pipeline infrastructure may be repaired.

In one example, the disclosure describes a sealing plug system that includes a shaft that extends through a hole in a conduit. A seal couples to the shaft. The seal sealingly engages an interior surface of the conduit. A reaction collar couples to the shaft. A locking system couples to the shaft. The locking system blocks movement of the shaft in a first direction and allows movement of the shaft in a second direction that is opposite the first direction.

In another example, the disclosure describes a method of repairing a flexible pipe that includes inserting a seal of a sealing plug system through a hole in an inner layer of the flexible pipe in a first direction. The method then drives a shaft coupled to the seal in a second direction opposite the first direction to compress the seal against an interior surface of the inner layer. The method then blocks movement of the shaft in the first direction with a locking mechanism.

In another example, the disclosure describes a pipe system that includes a sealing plug system for sealing a hole in the flexible pipe. The sealing plug system includes a shaft that extends through the hole in the outer layer and the inner layer. A seal couples to the shaft. The seal sealingly engages an interior surface of the inner layer. A reaction collar couples to the shaft. A locking system couples to the shaft. The locking system blocks movement of the shaft in a first direction and allows movement of the shaft in a second direction that is opposite the first direction.

Other aspects and advantages of the claimed subject matter will be apparent from the following description and the appended claims.

DETAILED DESCRIPTION

Figure 1:
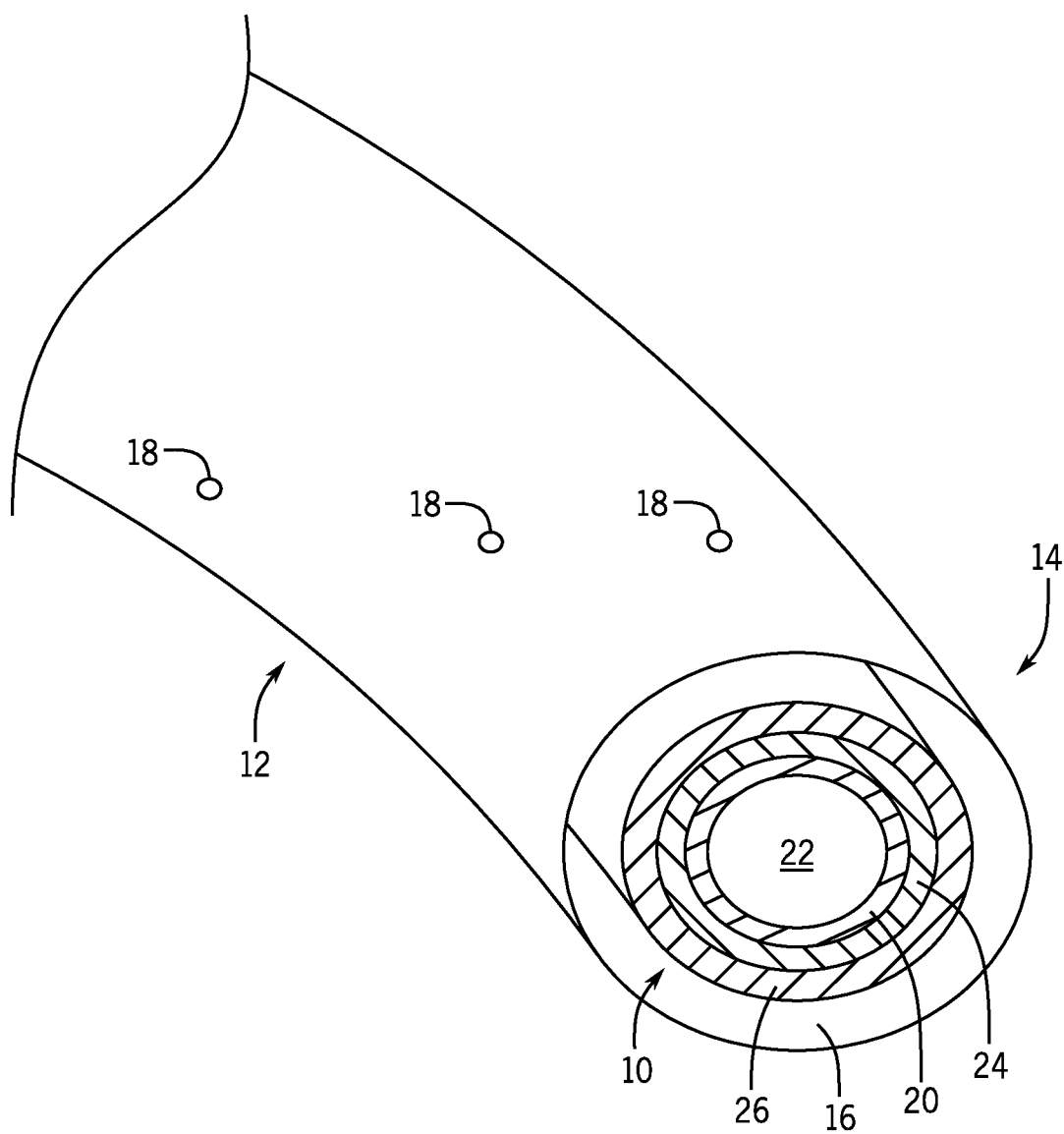
FIG. 1 is a perspective cross-sectional view of a flexible pipe installed within a carrier pipe, according to embodiments of the present disclosure.

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

As used herein, the term "coupled" or "coupled to" may indicate establishing either a direct or indirect connection, and is not limited to either unless expressly referenced as such. The term "set" may refer to one or more items. Wherever possible, like or identical reference numerals are used in the figures to identify common or the same elements. The figures are not necessarily to scale and certain features and certain views of the figures may be shown exaggerated in scale for purposes of clarification.

Furthermore, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

As explained above, pipeline operators may experience fuel theft through illegal tapping of their pipelines. These illegal taps result in fuel loss and spillage that damages the environment, and may affect the structural integrity of the pipelines. However, instead of digging up the existing pipeline or digging new trenches to install new pipeline, flexible pipe may be installed inside the existing pipeline. The existing pipeline then becomes a carrier pipe that provides a conduit for the rapid deployment of flexible pipe. This disclosure thus describes systems and methods that may allow the flexible pipe to be repaired in the event that a hole is drilled into the flexible pipe. The repair systems and methods of this disclosure are provided despite challenges from the structure of the flexible pipe that may limit the types of repairs that may be performed. As will be explained below, flexible pipe may include multiple layers of thermoplastic (e.g., high density polyethylene) that encase one or more layers of metal strips (e.g., steel). Accordingly, patching an illegal tap presents the challenge of sealing a hole through multiple layers of different materials. The disclosure below describes a repair system and method that enables the repair of flexible pipe, including when the flexible pipe is disposed within an existing carrier pipe.

FIG. 1 is a perspective cross-sectional view of a flexible pipe 10 (e.g., conduit) installed within a carrier pipe 12 (e.g., conduit) to form a pipeline infrastructure or pipe system 14. The carrier pipe 12 defines a bore 16 that receives the flexible pipe 10 during installation. Placing flexible pipe 10 within an existing pipe may save time and money by reducing and/or eliminating the construction of trenches and/or other infrastructure for laying flexible pipe.

In some situations, the carrier pipe 12 may already be buried below the surface. If a hole 18 is drilled into the flexible pipe 10, multiple layers of the flexible pipe 10 may be impacted. For example, the flexible pipe 10 may include a first or inner layer 20 that may be made from a thermoplastic (e.g., high density polyethylene (HDPE)). The inner layer 20 defines a bore 22 that carries a fluid (e.g., fuel). Surrounding the inner layer 20 is a second or middle layer 24 that may be made from a metal(s) (e.g., steel strips) that provides strength to the flexible pipe 10. And surrounding the middle layer 24 may be a third or outer layer 26 made from a thermoplastic (e.g., HDPE). The inner layer 20 and the outer layer 26 may protect the middle layer 24 from fluids within the bore 22 as well as from fluids and substances outside of the flexible pipe 10. For example, the inner layer 20 and the outer layer 26 may protect the middle layer 24 from corrosion.

It should be understood that flexible pipe 10 is a tube that conveys or transfers any water, gas, oil, or any type of suitable fluid. The flexible pipe 10 may be made of any type of materials including plastics, metals, composites (e.g., fiber-reinforced composites), and/or other suitable materials. The flexible pipe 10 may include Bonded or Unbonded Flexible Pipe, Flexible Composite Pipe (FCP), Thermoplastic Composite Pipe (TCP) or Reinforced Thermoplastic Pipe (RTP). FCP or RTP pipe may itself be generally composed of several layers. In one or more embodiments, a flexible pipe may include a thermoplastic liner or internal pressure sheath having a reinforcement layer and a thermoplastic outer cover layer. In one or more embodiments, the thermoplastic may be high density polyethylene (HDPE). Thus, flexible pipe may include different layers that may be made of a variety of materials and may also provide corrosion resistance. For example, in one or more embodiments, pipe used to make up a coil of pipe may have a corrosion protection outer cover layer that is disposed over another layer of steel reinforcement. For example, helically wound steel strips may be placed over a liner made of thermoplastic pipe. Flexible pipe may be designed to handle a variety of pressures. Accordingly, flexible pipe may offer unique features and benefits versus steel/carbon steel pipe lines in the area of corrosion resistance, flexibility, installation speed and re-usability. Another type of flexible or spoolable pipe is coiled tubing or reeled tubing, which may be made of steel and have corrosion protection shield layer.

Figure 2:
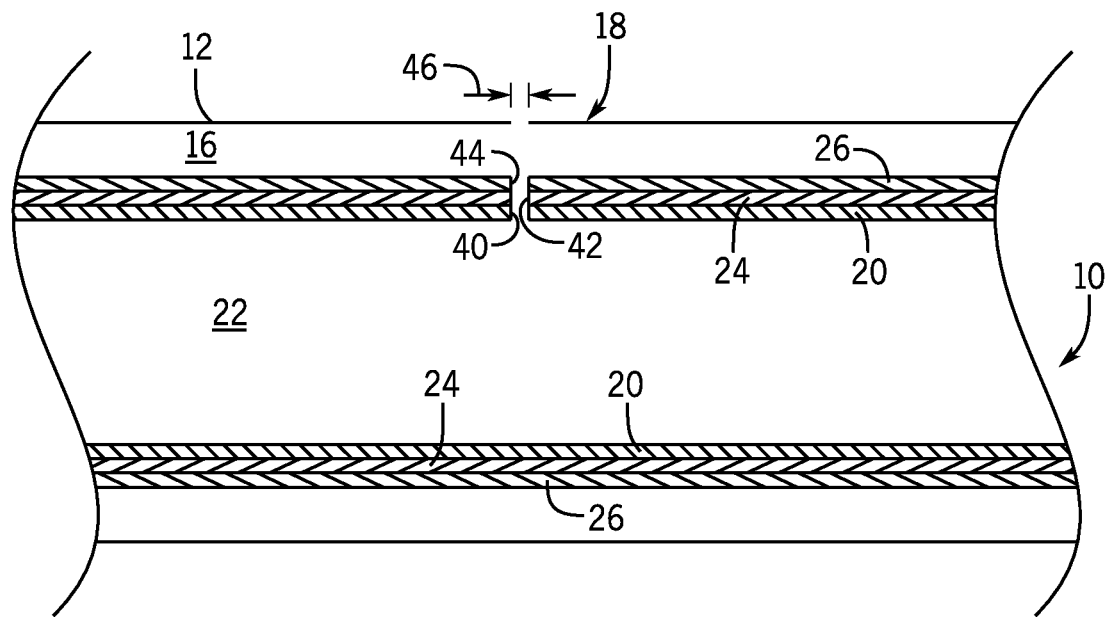
FIG. 2 is a cross-sectional side view of a flexible pipe within a carrier pipe with a hole drilled through the carrier pipe and the flexible pipe, according to embodiments of the present disclosure.

FIG. 2 is a cross-sectional side view of the flexible pipe 10 within the carrier pipe 12. The carrier pipe 12 defines an aperture or hole 18 and the flexible pipe 10 defines holes 40, 42, and 44 within the respective layers 20, 24, and 26 (e.g., first layer, second layer, third layer). These holes 18, 40, 42, and 44 may be formed when a hole is drilled to the bore 22 of the flexible pipe 10. After the holes 18, 40, 42, and 44 are drilled through the carrier pipe 12 and the flexible pipe 10, the holes 18, 40, 42, and 44 may have a similar cross-sectional area or diameter 46. As will be explained below, the method of repairing the flexible pipe 10 may involve changing these initial diameters.

Figure 3:
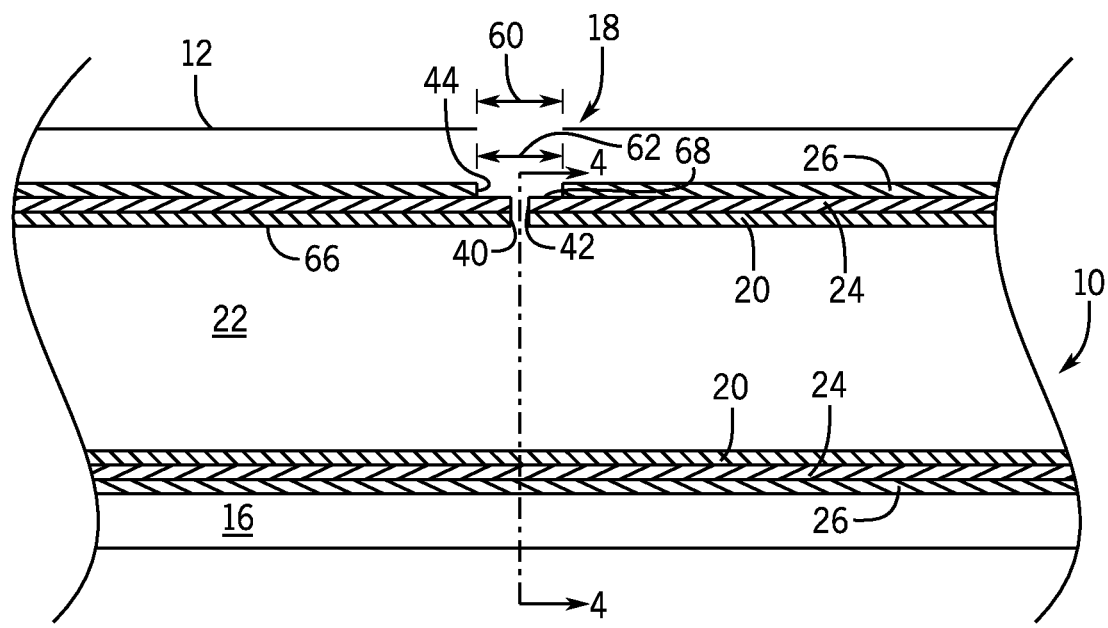
FIG. 3 is a cross-sectional side view of the flexible pipe within the carrier pipe seen in FIG. 1 after widening the hole in the carrier pipe, according to embodiments of the present disclosure.

FIG. 3 is a cross-sectional side view of the flexible pipe 10 within the carrier pipe 12 seen in FIG. 1. The method of repairing the flexible pipe 10 may begin with increasing the cross-sectional area or diameter of the hole 18 to a diameter 60 to form an access port or window in the carrier pipe 12. Increasing the size of hole 18 facilitates access to and insertion of tools or equipment into the bore 16 of the carrier pipe 12. The size of the hole 18 may be increased by cutting the carrier pipe 12 using cold cutting or hot cutting techniques. In some situations, it may be desirable to cold cut the carrier pipe 12 to increase the size of the hole 18 to block or reduce combustion of fuel or fumes. In some embodiments, after increasing the size of the hole 18, the repair method increases a cross-sectional area or diameter 62 of the hole 44 and the hole 42. Clearing away material of the outer layer 26 and the middle layer 24 may enable insertion of a seal through the hole 40, and the coupling and sealing of a sealing plug system to an interior surface 66 and an exterior surface 68 of the inner layer 20.

Figure 4:
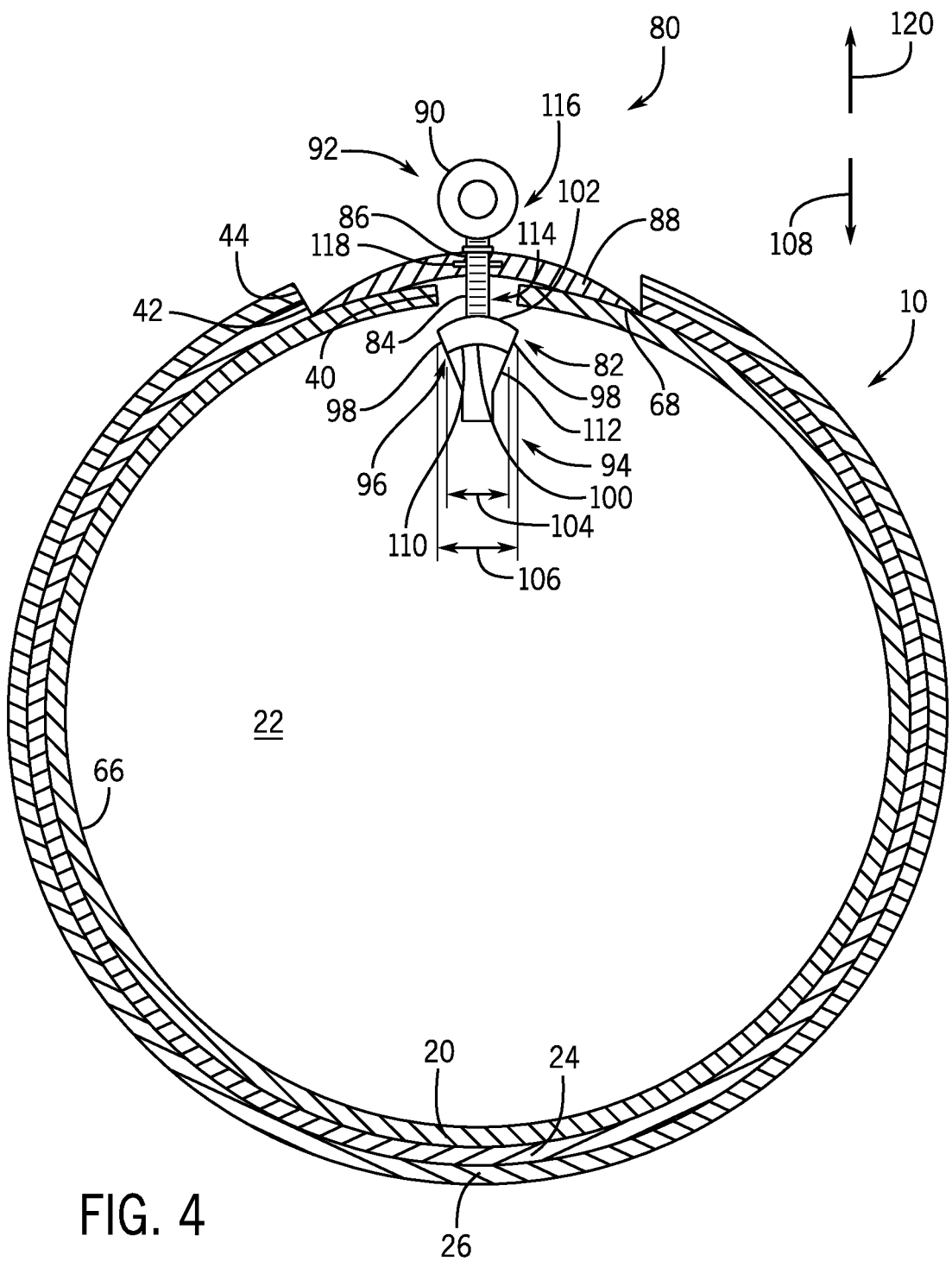
FIG. 4 is a partial cross-sectional side view of the flexible pipe in FIG. 3 along line 4-4 with a sealing plug system coupled to the flexible pipe, according to embodiments of the present disclosure.

FIG. 4 is a partial cross-sectional side view of the flexible pipe 10 of FIG. 3 along line 4-4 with a sealing plug system 80 coupled to the flexible pipe 10. The sealing plug system 80 includes a seal 82 (e.g., rubber, plastic, swellable material) that couples to a shaft 84 (e.g., metal shaft). The shaft 84 extends through an aperture 86 in a reaction collar 88 and couples to a pull ring 90 at a first end 92. At an opposite or second end 94, the shaft 84 couples to a sleeve 96. As will be explained below, the sleeve 96 and reaction collar 88 enable movement and energizing of the seal 82 around the hole 40.

In order to insert the seal 82 through the hole 40 and into the bore 22, the seal 82 includes a tapered surface 98 (e.g., circumferential tapered surface). The tapered surface 98 progressively increases from a first end face 100 to a second end face 102 of the seal 82. In operation, the tapered surface 98 facilitates insertion of the seal 82 into the bore 22 through the hole 40 as well as sealing against the inner layer 20. For example, a width 104 of the seal 82 at the first end face 100 may be less than the diameter or width of the hole 40 enabling the first end face 100 to pass through the hole 40. As the seal 82 enters the hole 40, the seal 82 contacts the inner layer 20 around the hole 40 as the tapered surface 98 increases the width of the seal 82 from the width 104 to a width 106 at the second end face 102. As the seal 82 is driven further in direction 108, the tapered surface 98 facilities compression and temporary deformation of the seal 82 as the seal 82 passes through the hole 40. In other words, the width 106 of the seal 82 at the second end face 102 is greater than the width/diameter of the hole 40. After passing through the hole 40, the seal 82 returns to its original shape to facilitate sealing around the hole 40. In this way, the seal 82 is able to pass through the hole 40 while still providing a surface area sufficient to seal around the hole 40.

As illustrated, the sleeve 96 includes an end face 110 that contacts the first end face 100 of the seal 82. It is this end face 110 that enables the sleeve 96 to energize the seal 82 against the inner layer 20. In some embodiments, the sleeve 96 may define a tapered surface 112 (e.g., circumferential tapered surface). The tapered surface 112 may facilitate insertion of the sleeve 96 through the hole 40 of the inner layer 20. For example, the tapered surface 112 may facilitate alignment of the sleeve 96 with the hole 40. The sleeve 96 couples to and moves with the shaft 84. For example, the sleeve 96 may be welded, brazed, friction fit, and/or threaded onto the shaft 84. In some embodiments, the sleeve 96 and shaft 84 may be one-piece or integrally formed.

As explained above, the shaft 84 extends through an aperture 86 in the reaction collar 88 and couples to the pull ring 90. The pull ring 90 may be welded, brazed, friction fit, and/or threaded onto the shaft 84. In some embodiments, the pull ring 90 and the shaft 84 may be one-piece or integrally formed. In operation, the pull ring 90 enables an operator and/or machine to pull the shaft 84 through the reaction collar 88. As the shaft 84 moves through the reaction collar 88, locking grooves or ridges 114 on the shaft 84 engage a locking system 116 within or coupled to the reaction collar 88. For example, the locking system 116 may include locking lugs or dogs 118 (e.g., locking mechanism) that are biased (e.g., spring biased) towards the aperture 86 to engage the locking grooves or ridges 114. In operation, the locking system 116 enables one-way movement of the shaft 84 in direction 120 but blocks retraction or movement of the shaft 84 in direction 108.

Figure 5:
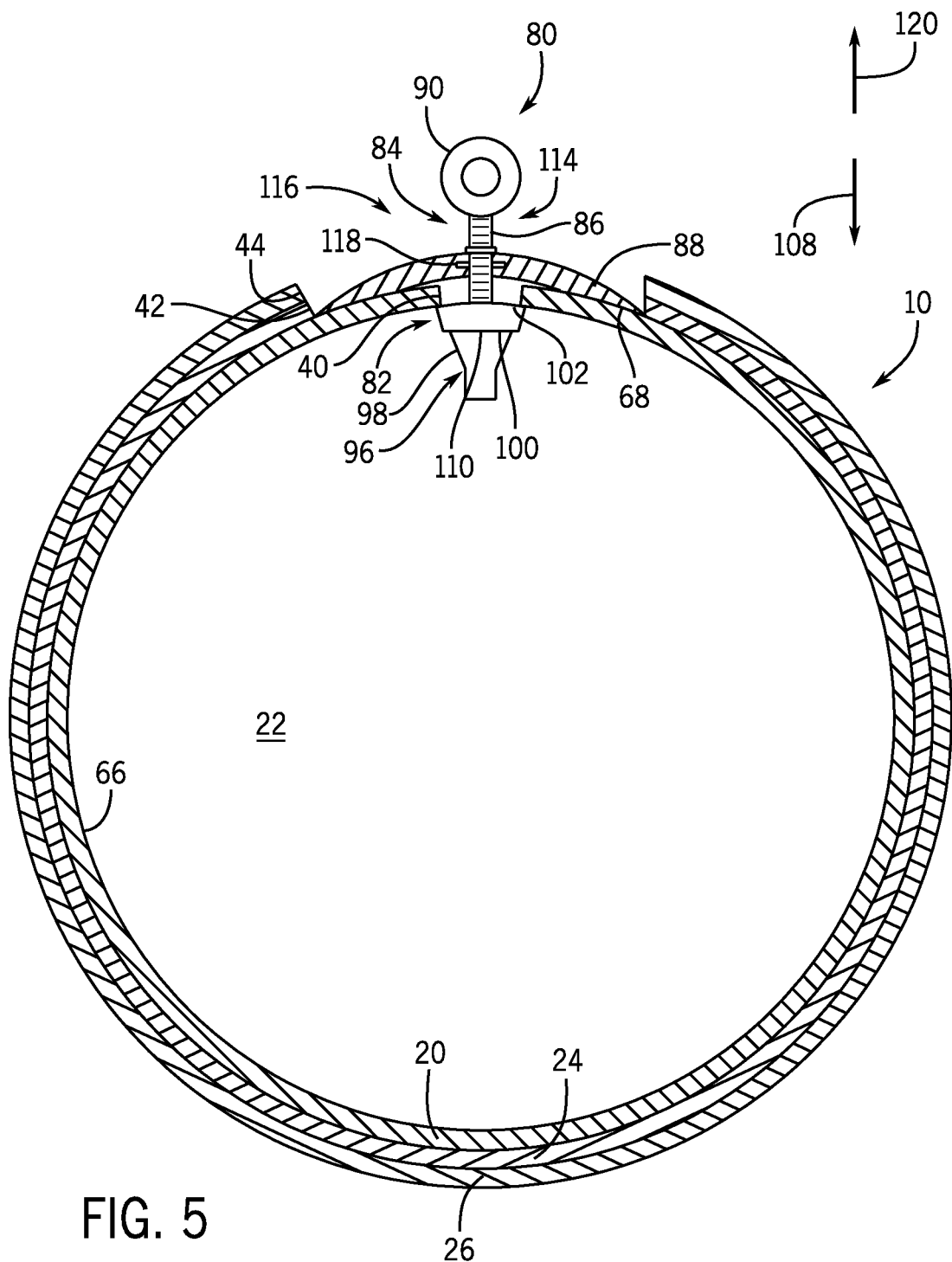
FIG. 5 is a cross-sectional side view of the sealing plug system sealing a hole in the flexible pipe of FIG. 4, according to embodiments of the present disclosure.

FIG. 5 is a cross-sectional side view of the sealing plug system 80 sealing a hole 40 in the flexible pipe 10 of FIG. 4. As illustrated, the pull ring 90 and shaft 84 have moved in direction 120. As the shaft 84 moves in direction 120 the sleeve 96 compresses the seal 82 against an interior surface 66 of the inner layer 20. Specifically, the contact between the end face 110 of the sleeve 96 and the first end face 100 of the seal 82 drives the second end face 102 of the seal 82 into contact with the interior surface 66 of the inner layer 20. The sleeve 96 may therefore include a material (e.g., metal) that is more resilient than the material of the seal 82 to enable the sleeve 96 to deform the seal 82 against the inner layer 20. The compression of the seal 82 against the inner layer 20 forms a seal around the hole 40 to block fluid within the bore 22 from escaping the flexible pipe 10 through the hole 40.

The seal 82 is held or maintained in a deformed or energized state by the locking system 116. As explained above, as the shaft 84 moves in direction 120, the locking system 116 enables the grooves or ridges 114 to slide past the locking dogs 118. The locking dogs 118 of the locking system 116 engage the grooves or ridges 114 to block movement of the shaft 84 in direction 108. The reaction collar 88 supports the locking system 116 and provides the reaction force in direction 120 that is opposite the force of the energized seal 82. As illustrated, the reaction collar 88 has an area greater than the hole 40, the reaction collar 88 is therefore supported through contact with the exterior surface 68 of the inner layer 20. In some embodiments, the reaction collar 88 may be supported through contact with the middle layer 24 or the outer layer 26. The interaction between the locking system 116 and the shaft 84 can therefore be described as a type of ratcheting system that enables increasing compression of the seal 82 against the inner layer 20. In this way, the sealing plug system 80 seals the hole 40 in the inner layer 20. In some embodiments, the seal 82 may include a swellable material that swells in response to absorption of the fluid (e.g., fuel) flowing through the bore 22. The swellable material may harden and/or increase the tension on the shaft 84 to maintain sealing contact of the seal 82 around the hole 40.

It should be understood that the sealing plug system 80 may include another attachment fixture besides the pull ring 90. For example, the sealing plug system 80 may include arms or bars angled relative to the shaft 84 that enable an operator or machine to pull the shaft 84 in direction 120. It should also be understood that the material of the seal 82, sleeve 96, and shaft 84 may be chemically resistant to the fluid (e.g., fuel) flowing through the bore 22.

Figure 6:
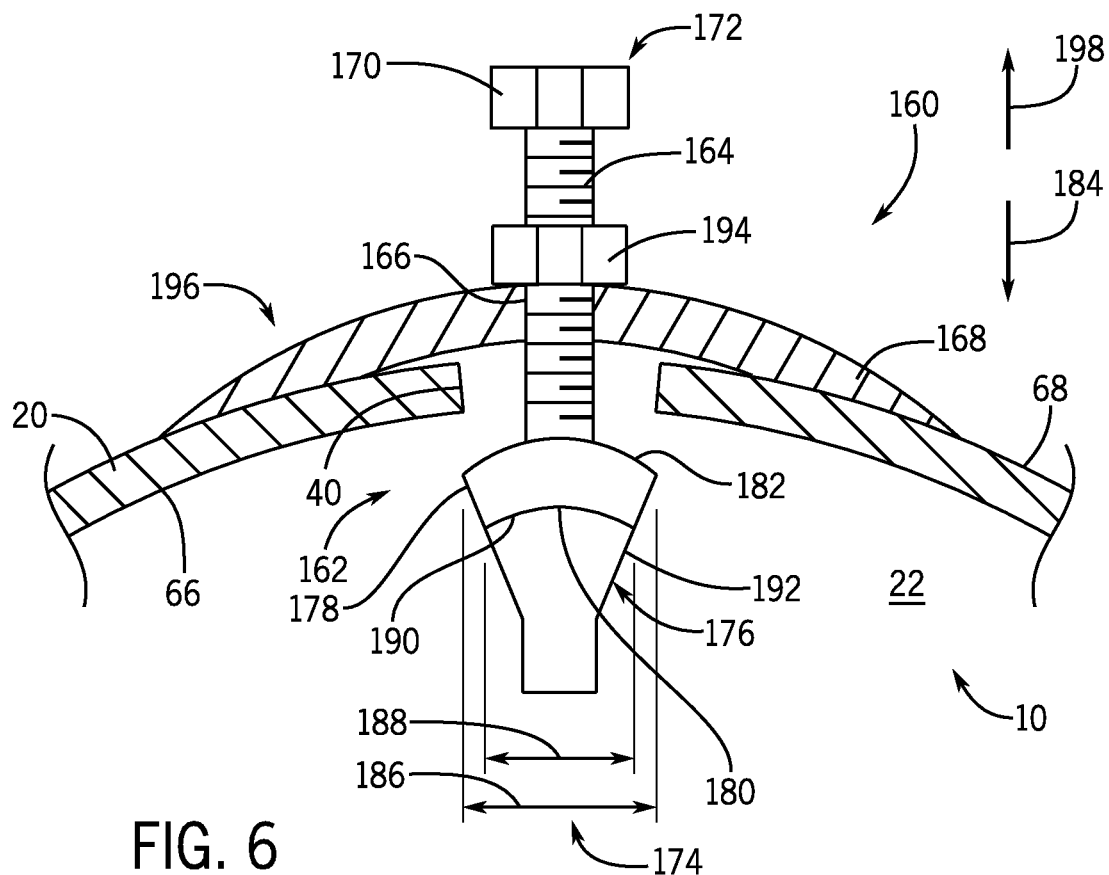
FIG. 6 is a cross-sectional side view of a sealing plug system coupled to a flexible pipe, according to embodiments of the present disclosure.

FIG. 6 is a partial cross-sectional side view of the flexible pipe 10 of FIG. 3 along line 4-4 with a sealing plug system 160 coupled to the flexible pipe 10. The sealing plug system 160 includes a seal 162 (e.g., rubber, plastic, swellable material) that couples to a shaft 164 (e.g., metal shaft). The shaft 164 extends through an aperture 166 in a reaction collar 168 and couples to a head 170 at a first end 172. At an opposite or second end 174, the shaft 164 couples to a sleeve 176. In order to insert the seal 162 through the hole 40 and into the bore 22, the seal 162 includes a tapered surface 178 (e.g., circumferential tapered surface). The tapered surface 178 progressively increases from a first end face 180 to a second end face 182 of the seal 162. In operation, the tapered surface 178 facilitates insertion of the seal 162 into the bore 22 through the hole 40 as well as the sealing of the seal 162 against the inner layer 20. For example, a width 188 of the seal 162 at the first end face 180 may be less than the diameter or width of the hole 40 enabling the seal 162 the first end face 180 to pass through the hole 40. As the seal 162 enters the hole 40 in direction 184, the tapered surface 178 of the seal 162 contacts the inner layer 20 around the hole 40. As the seal 162 is driven further in direction 184, the tapered surface 178 facilitates compression and temporary deformation of the seal 162 as the seal 162 passes through the hole 40. In other words, a width 186 of the seal 162 at the second end face 182 becomes greater than a width/diameter of the hole 40. After passing through the hole 40, the seal 162 returns to its original shape to facilitate sealing against around the hole 40. In this way, the sealing plug system 160 provides a sealing surface that extends beyond the area of the hole 40 in order to seal the hole 40 from within the flexible pipe 10.

As illustrated, the sleeve 176 includes an end face 190 that contacts the first end face 180 of the seal 162. As will be explained below, the end face 190 enables the sleeve 176 to energize the seal 162 against the inner layer 20. In some embodiments, the sleeve 176 may include a tapered surface 192 (e.g., circumferential tapered surface). The tapered surface 192 may facilitate insertion of the sleeve 176 through the hole 40 of the inner layer 20. For example, the tapered surface 192 of the sleeve 176 may facilitate alignment of the sleeve 176 with the hole 40. The sleeve 176 couples to the shaft 164. For example, the sleeve 176 may be welded, brazed, friction fit, and/or threaded onto the shaft 164. In some embodiments, the sleeve 176 and shaft 164 may be one-piece or integrally formed.

As explained above, the shaft 164 extends through the aperture 166 in the reaction collar 168 and couples to the head 170. The head 170 may be welded, brazed, friction fit, and/or threaded onto the shaft 164. Between the head 170 and the reaction collar 168 may be a nut 194 (e.g., locking mechanism) that threadingly couples to the shaft 164. In operation, the nut 194 and head 170 form a locking/energizing system 196 that drives the seal 162 in direction 198 and into contact with the inner layer 20. For example, a first tool (e.g., socket wrench) may couple to the head 170 of the shaft 164 and a second tool (e.g., a crescent wrench) may couple to the nut 194. The operator may then restrict rotation of the nut 194 with the second tool while rotating the head 170 with the first tool. As the head 170 rotates, the shaft 164 moves in direction 198 pulling or driving the seal 162 into contact with the inner layer 20 forming a seal around the hole 40. In some embodiments, the opposite may occur with the head 170 held stationary with the first tool and the nut 194 rotated with the second tool to drive the seal 162 into contact with the inner layer 20. In still other embodiments, the reaction collar 168 may be threaded around the aperture 166. The shaft 164 may therefore be threaded into the reaction collar 168. In operation, the reaction collar 168 may operate as the nut 194 described above. For example, the reaction collar 168 may be held stationary (e.g., held stationary through contact with the inner layer 20) while the head 170 is rotated to drive the shaft 164 and seal 162 in the direction 198 to form the seal around the hole 40.

Figure 7:
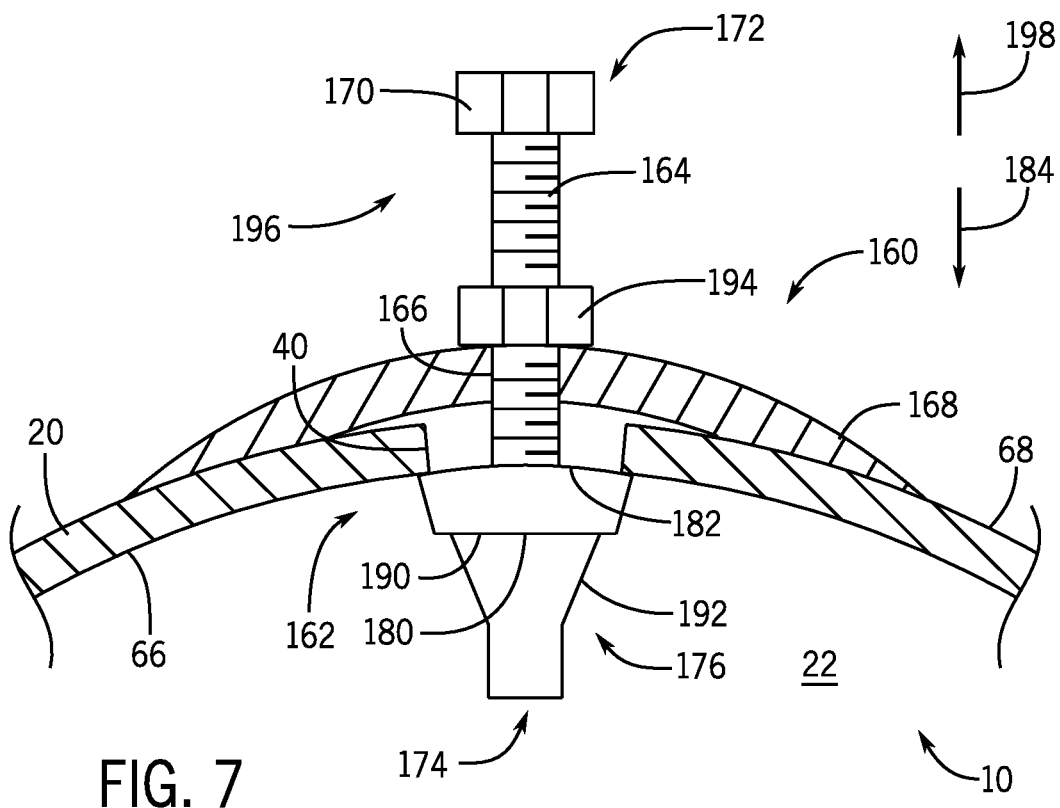
FIG. 7 is a cross-sectional side view of the sealing plug system sealing a hole in the flexible pipe of FIG. 6, according to embodiments of the present disclosure.

FIG. 7 is a cross-sectional side view of the sealing plug system 160 sealing the hole 40 in the flexible pipe 10 of FIG. 6. As illustrated, the head 170 and shaft 164 have been moved in direction 198. As the shaft 164 moves in direction 198, the sleeve 176 compresses the seal 162 against an interior surface 66 of the inner layer 20. Specifically, the contact between the end face 190 of the sleeve 176 and the first end face 180 of the seal 162 drives the second end face 182 of the seal 162 into contact with the interior surface 66 of the inner layer 20. The sleeve 176 may therefore include a material (e.g., metal) that is more resilient than the material of the seal 162 to enable the sleeve 176 to deform the seal 162 against the inner layer 20. The compression of the seal 162 against the inner layer 20 forms a seal around the hole 40 to block fluid within the bore 22 from escaping the flexible pipe 10 through the hole 40. The seal 162 is then held or maintained in a deformed or energized state by the energizing system 196. In some embodiments, the seal 162 may include a swellable material that swells in response to absorption of the fluid (e.g., fuel) flowing through the bore 22. The swellable material may harden and/or increase the tension on the shaft 164 to maintain the seal around the hole 40. It should also be understood that the material of the seal 162, sleeve 176, and shaft 164 may be chemically resistant to the fluid (e.g., fuel) flowing through the bore 22.

Figure 8:
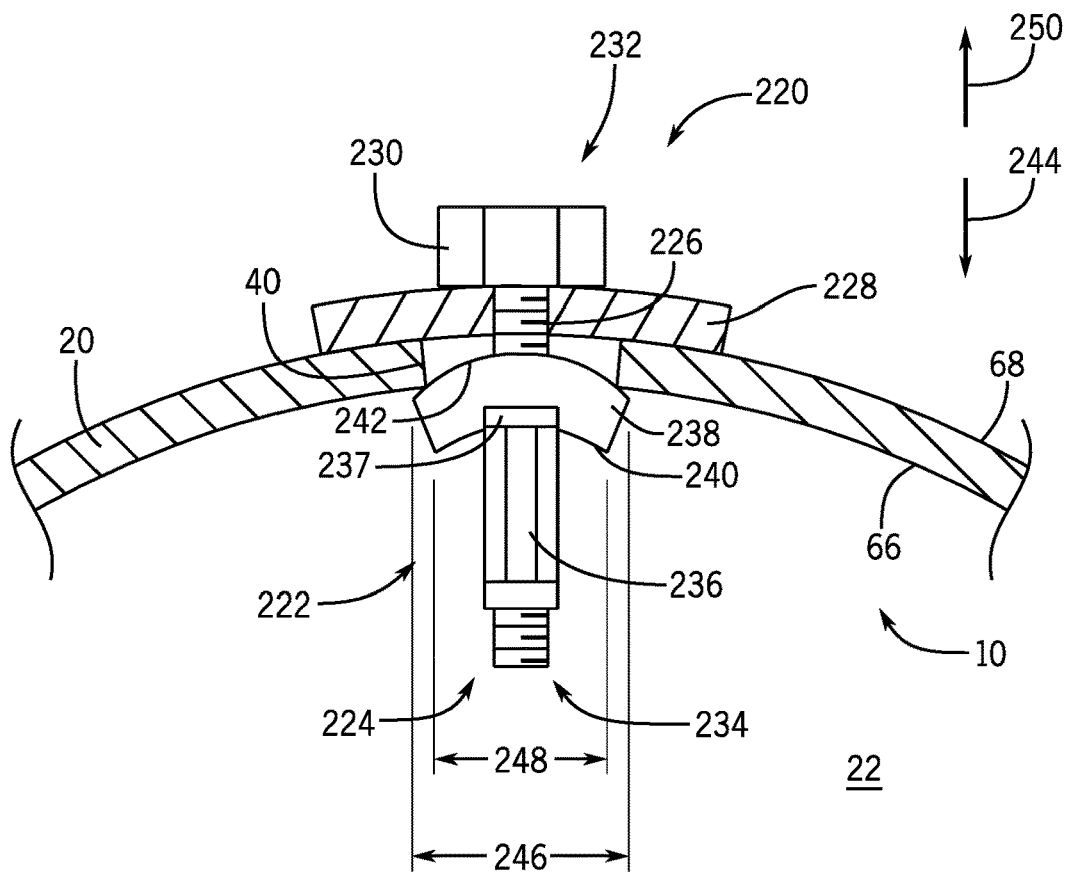
FIG. 8 is a cross-sectional side view of a sealing plug system sealing a hole in a flexible pipe, according to embodiments of the present disclosure.

FIG. 8 is a partial cross-sectional side view of the flexible pipe 10 of FIG. 3 along line 4-4 with a sealing plug system 220 coupled to the flexible pipe 10. The sealing plug system 220 includes a seal 222 (e.g., rubber, plastic, swellable material) that couples to a shaft 224. The shaft 224 extends through an aperture 226 in a reaction collar 228 and couples to a head 230 at a first end 232. At an opposite or second end 234, the shaft 224 threadingly couples to a sleeve 236 (e.g., metal sleeve). The sleeve 236 includes a portion 237 embedded in the seal 222. In order to insert the seal 222 through the hole 40 and into the bore 22, the seal 222 may define a tapered surface 238 (e.g., circumferential tapered surface). The tapered surface 238 progressively increases from a first end face 240 to a second end face 242 of the seal 222. In operation, the tapered surface 238 facilitates insertion of the seal 222 into the bore 22 through the hole 40 as well as sealing against the inner layer 20. For example, a width 248 of the seal 222 at the first end face 240 may be less than the diameter or width of the hole 40 enabling the seal 222 to enter the hole 40. As the seal 222 enters the hole 40 in direction 244, the tapered surface 238 of the seal 222 contacts the inner layer 20 around the hole 40. As the seal 222 is driven further in direction 244, the tapered surface 238 facilities compression and temporary deformation of the seal 222 as the seal 222 passes through the hole 40. In other words, a width 246 of the seal 222 at the second end face 242 is greater than a width/diameter of the hole 40. After passing through the hole 40, the seal 222 returns to its original shape to facilitate sealing around the hole 40. In this way, the sealing plug system 220 provides a sealing surface that extends beyond the area of the hole 40 in order to seal the hole 40 from within the flexible pipe 10.

After insertion of the seal 222 through the hole 40, the seal 222 maintains contact with an interior surface 66 of the inner layer 20. The contact between the seal 222 and the interior surface 66 resists and/or blocks rotation of the seal 222 and by extension the sleeve 236, which couples to the seal 222. In operation, a tool (e.g., socket wrench) rotates the shaft 224 by rotating the head 230. As the shaft 224 rotates, the sleeve 236 moves in direction 250. Movement of the sleeve 236 in direction 250 enables the sleeve 236 to compress the seal 222 against the interior surface 66 around the hole 40 forming a seal.

Figure 9:
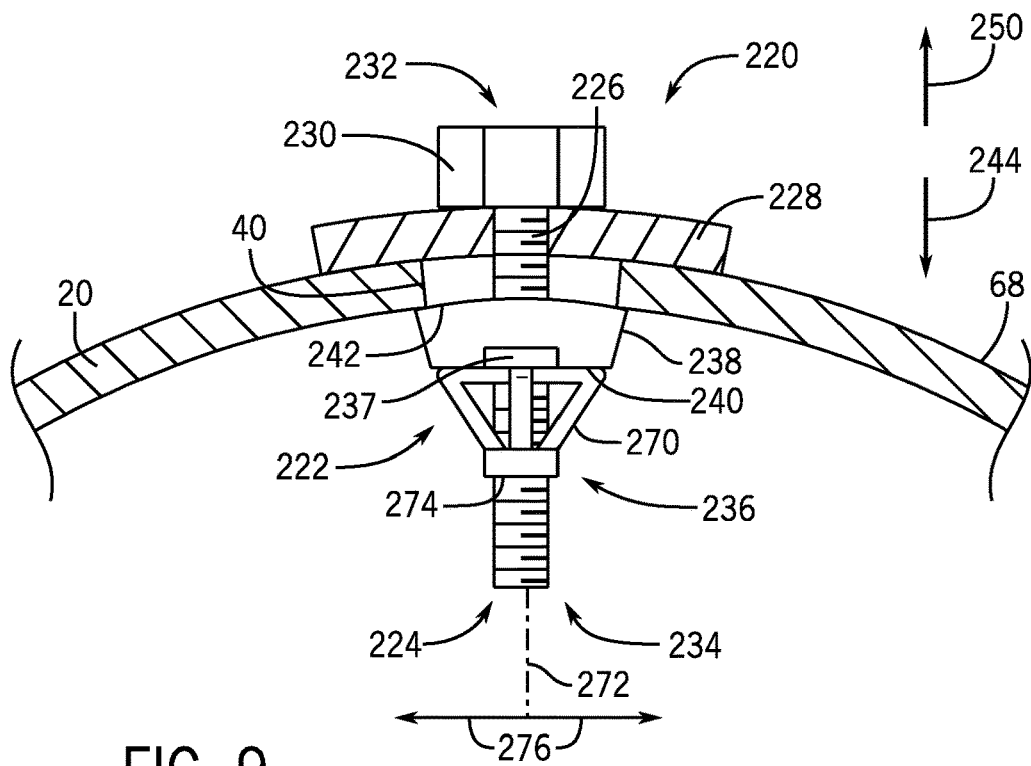
FIG. 9 is a cross-sectional side view of a sealing plug system sealing a hole in a flexible pipe, according to embodiments of the present disclosure.

FIG. 9 is a cross-sectional side view of the sealing plug system 220 sealing a hole 40 in the flexible pipe 10 of FIG. 8. In some embodiments, the sleeve 236 may form wings or arms 270 that extend radially outward from a central axis 272 of the sleeve 236. These wings or arms 270 provide additional contact area between the sleeve 236 and the seal 222. The increased contact area may enable a more uniform force distribution over the seal 222 and thus a more stable seal around the hole 40. As explained above, as the shaft 224 rotates, the sleeve 236 moves in direction 250. As the sleeve 236 moves in direction 250, the sleeve 236 compresses the seal 222 against the interior surface 66 of the inner layer 20. As the sleeve 236 continues to move in direction 250, the sleeve 236 compresses between the embedded portion 237 and an end portion 274. The additional compression drives the wings or arms 270 radially outward in direction 276 creating additional contact area between the sleeve 236 and the seal 222. In some embodiments, the seal 222 may include a swellable material that swells in response to absorption of the fluid (e.g., fuel) flowing through the bore 22. The swellable material may harden and/or increase the tension on the shaft 224 to maintain the seal around the hole 40. It should also be understood that the material of the seal 222, sleeve 236, and shaft 224 may be chemically resistant to the fluid (e.g., fuel) flowing through the bore 22.

Figure 10:
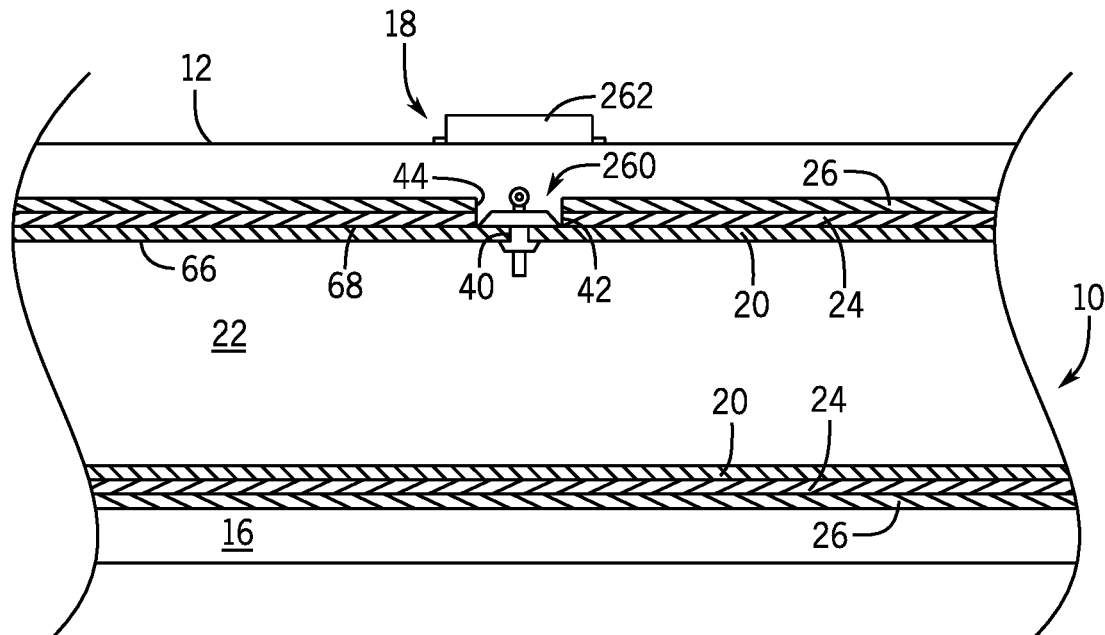
FIG. 10 is a cross-sectional side view of the flexible pipe within the carrier pipe seen in FIG. 3 with a sealing plug system sealing a hole within the flexible pipe, according to embodiments of the present disclosure.

FIG. 10 is a cross-sectional side view of the flexible pipe 10 within the carrier pipe 12 seen in FIG. 3 with a sealing plug system 260 (e.g., sealing plug system 80, sealing plug system 160, sealing plug system 220) sealing the hole 40 in the inner layer 20. After sealing the hole 40, the repair method may continue by closing the window or hole 18 in the carrier pipe 12. For example, a metal plate 262 may be welded to the carrier pipe 12 over hole 18 to block access to the sealing plug system 260.

Figure 11:
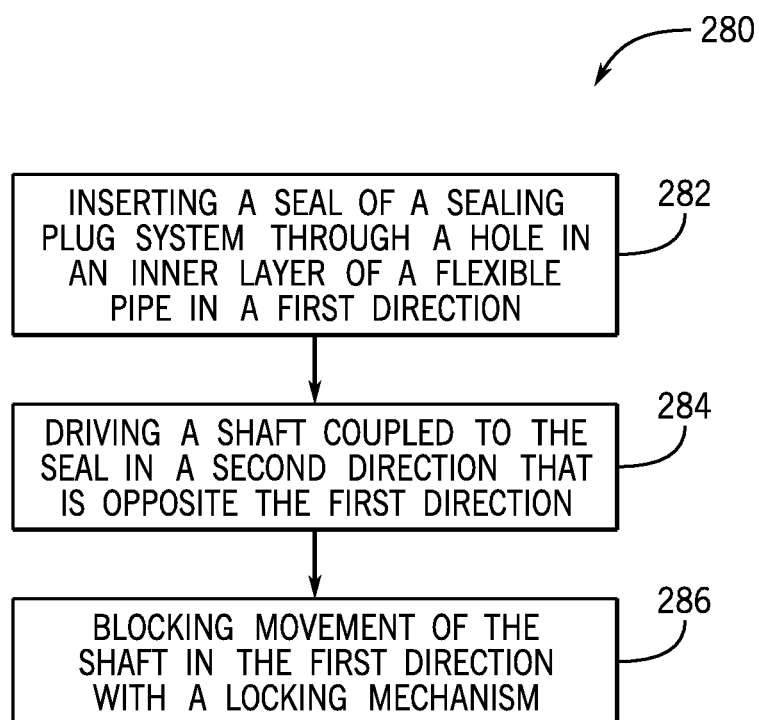
FIG. 11 is a flowchart of a method for sealing a hole in a flexible pipe with a sealing plug system, according to embodiments of the present disclosure.

FIG. 11 is a flowchart of a method 280 of repairing a hole in a flexible pipe (e.g., flexible pipe 10) with a sealing plug system (e.g., sealing plug system 80 or 160). The method 280 begins by inserting a seal of a sealing plug system through a hole in an inner layer of a flexible pipe in a first direction, step 282. The method 280 then drives a shaft coupled to the seal in a second direction that is opposite the first direction, step 284. The method 280 then blocks movement of the shaft in the first direction with a locking mechanism, step 286. The method 280 disclosed herein includes various steps represented by blocks. Although the flowchart illustrates the steps in a certain sequence, it should be understood that the steps may be performed in any suitable order and certain steps may be carried out simultaneously, where appropriate. Additionally, steps may be added to or omitted from the method 280. For example, the method 280 may include additional steps as described above in the description of FIGS. 2-10.

Technical effects of the invention include the ability to seal holes in a flexible pipe formed from multiple layers. Another effect is the ability to seal a hole in a flexible pipe positioned within a carrier pipe.

As used herein, the terms "inner" and "outer"; "up" and "down"; "upper" and "lower"; "upward" and "downward"; "above" and "below"; "inward" and "outward"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the elements of the methods described herein are illustrated and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

Finally, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A sealing plug system for sealing a hole that is formed in a flexible pipe, comprising:
    a shaft configured to extend through the hole in the flexible pipe;
    a seal coupled to the shaft, wherein the seal comprises:
        a first end face and a second end face; and
        a tapered surface that extends between the first end face and the second end face, wherein the tapered surface is configured to facilitate insertion of the seal through the hole in the flexible pipe in a first direction and to resist removal of the seal through the hole in the flexible pipe in a second direction opposite the first direction to enable the seal to sealingly engage an interior surface of the flexible pipe;
    a reaction collar, wherein the shaft is configured to extend through the reaction collar; and
    a locking system configured to be coupled to the shaft, to enable the locking system to block movement of the shaft in the first direction and to allow movement of the shaft in the second direction that is opposite the first direction.

2. The sealing plug system of claim 1, comprising a sleeve, wherein the sleeve is configured to contact the first end face of the seal to energize the seal against the flexible pipe.

3. The sealing plug system of claim 1, wherein the shaft comprises ridges or defines grooves that engage the locking system.

4. The sealing plug system of claim 3, wherein the locking system comprises a locking lug configured to engage the ridges or the grooves on the shaft.

5. The sealing plug system of claim 1, wherein the shaft is threaded.

6. The sealing plug system of claim 5, wherein the locking system comprises a nut configured to couple to the shaft to block movement of the shaft in the second direction.

7. The sealing plug system of claim 1, comprising a ring coupled to the shaft, wherein the ring is configured to facilitate movement of the shaft in the second direction.

8. The sealing plug system of claim 1, comprising a head coupled to the shaft, wherein the head is configured to engage a tool to facilitate movement of the shaft in the second direction.

9. A method of repairing a flexible pipe, comprising:
    inserting a seal of a sealing plug system through a hole in an inner layer of the flexible pipe in a first direction, wherein the seal comprises:
        a first end face and a second end face; and
        a tapered surface that extends between the first end face and the second end face to facilitate insertion of the seal through the hole in the inner layer of the flexible pipe in the first direction and to resist removal of the seal through the hole in the inner layer of the flexible pipe in a second direction opposite the first direction;
    driving a shaft coupled to the seal in the second direction opposite the first direction to compress the seal against an interior surface of the inner layer of the flexible pipe; and
    blocking movement of the shaft in the first direction with a locking mechanism.

10. The method of claim 9, wherein driving the shaft in the second direction comprises coupling a tool to the shaft.

11. The method of claim 9, comprising increasing a size of an opening in a carrier pipe surrounding the flexible pipe to provide access to the hole in the inner layer of the flexible pipe.

12. The method of claim 11, comprising sealing the opening in the carrier pipe after sealing the hole in the inner layer of the flexible pipe.

13. The method of claim 9, comprising removing material from one or more layers of the flexible pipe that surround the inner layer of the flexible pipe.

14. A sealing plug system for sealing a hole in a flexible pipe, comprising:
- a shaft configured to extend through the hole in the flexible pipe;
- a seal coupled to the shaft, wherein the seal is configured to sealingly engage an interior surface of the flexible pipe;
- a reaction collar, wherein the shaft is configured to extend through the reaction collar;
- a locking system configured to be coupled to the shaft to enable the locking system to block movement of the shaft in the first direction and to allow movement of the shaft in the second direction that is opposite the first direction; and
- a sleeve, wherein the sleeve is configured to contact an end face of the seal to energize the seal against the flexible pipe.

15. The sealing plug system of claim 14, wherein the seal comprises a tapered surface configured to facilitate insertion of the seal through the hole in the conduit in the first direction and to resist removal of the seal through the hole in the second direction.

16. The sealing plug system of claim 14, wherein:
- the shaft comprises ridges or defines grooves that engage the locking system; and
- the locking system comprises a locking lug configured to engage the ridges or the grooves on the shaft.

17. The sealing plug system of claim 14, wherein:
- the shaft is threaded; and
- the locking system comprises a nut configured to couple to the shaft to block movement of the shaft in the second direction.

18. The sealing plug system of claim 14, comprising a ring coupled to the shaft, wherein the ring is configured to facilitate movement of the shaft in the second direction.

19. The sealing plug system of claim 14, comprising a head coupled to the shaft, wherein the head is configured to engage a tool to facilitate movement of the shaft in the second direction.

* * * * *